US008417625B2

(12) United States Patent
Bannerjee et al.

(10) Patent No.: US 8,417,625 B2
(45) Date of Patent: Apr. 9, 2013

(54) APPARATUS AND METHODS FOR FACILITATING REAL ESTATE TRANSACTIONS

(75) Inventors: Sudeshna Bannerjee, Waxhaw, NC (US); Robert Caruso, Charlotte, NC (US); Michael Kelly, Minneapolis, MN (US); Kim Barbour, Lighthouse Point, FL (US); Debashis Ghosh, Charlotte, NC (US); Robert Mauldin, Charlotte, NC (US); Robert Huber Eshleman, Charlotte, NC (US); Timothy O'Brien, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 692 days.

(21) Appl. No.: 12/258,511

(22) Filed: Oct. 27, 2008
(Under 37 CFR 1.47)

(65) Prior Publication Data
US 2010/0106639 A1    Apr. 29, 2010

(51) Int. Cl.
*G06Q 40/00* (2012.01)
(52) U.S. Cl. ............................ 705/38; 705/35
(58) Field of Classification Search ............... 705/35
See application file for complete search history.

(56) References Cited

U.S. PATENT DOCUMENTS

| | | | |
|---|---|---|---|
| 7,107,241 B1 * | 9/2006 | Pinto | 705/38 |
| 2006/0111995 A1 * | 5/2006 | Reddy | 705/35 |
| 2007/0050285 A1 * | 3/2007 | Freeman | 705/38 |
| 2009/0240550 A1 * | 9/2009 | McCarty | 705/9 |

OTHER PUBLICATIONS

John Rebchook, Home Closings Made Simple Denver Company's Job is to Eliminate Problems that can derail the Sale, Denver Rocky Mountain News, Jun. 23, 2000, p. 2B.*
http://www.chicora.com/service/ retrieved on Jun. 5, 2008.

* cited by examiner

*Primary Examiner* — William Rankins
(74) *Attorney, Agent, or Firm* — Weiss & Arons LLP; Michael Springs (57) ABSTRACT

Apparatus and methods for approving financing for the sale of real estate. The apparatus and methods may involve receiving from a seller, or a seller's agent, information regarding the property so that a financial institution can determine a loan amount before the seller is engaged by a buyer. The financial institution may order from vendors documentation and certification desired or required for closing. The financial institution may issue a seal certifying that the financial institution has pre-approved a loan in a stated amount. The amount may be subject to change based on the qualifications of a buyer.

28 Claims, 7 Drawing Sheets

APPARATUS AND METHODS FOR FACILITATING REAL ESTATE TRANSACTIONS

FIELD OF TECHNOLOGY

Aspects of the disclosure relate to the confirmation of salability of real estate.

BACKGROUND

Currently, the process of selling a property, such as a home, involves listing the property for sale, finding a buyer and entering into a purchase contract. Once there is a purchase contract on the house, then the transaction has to be backed up with documentation such as inspection, title, collateral appraisal, buyer side appraisal, insurances, warranties and other credit verification loan documents.

Also, the current mortgage process is disaggregated, because buyers, sellers, realtors and financial institutions must collectively advance the transaction process. This presents a fundamental inefficiency in closing deals. An average time to close a mortgage is 30 days, but the process can take much longer.

Figure 1:
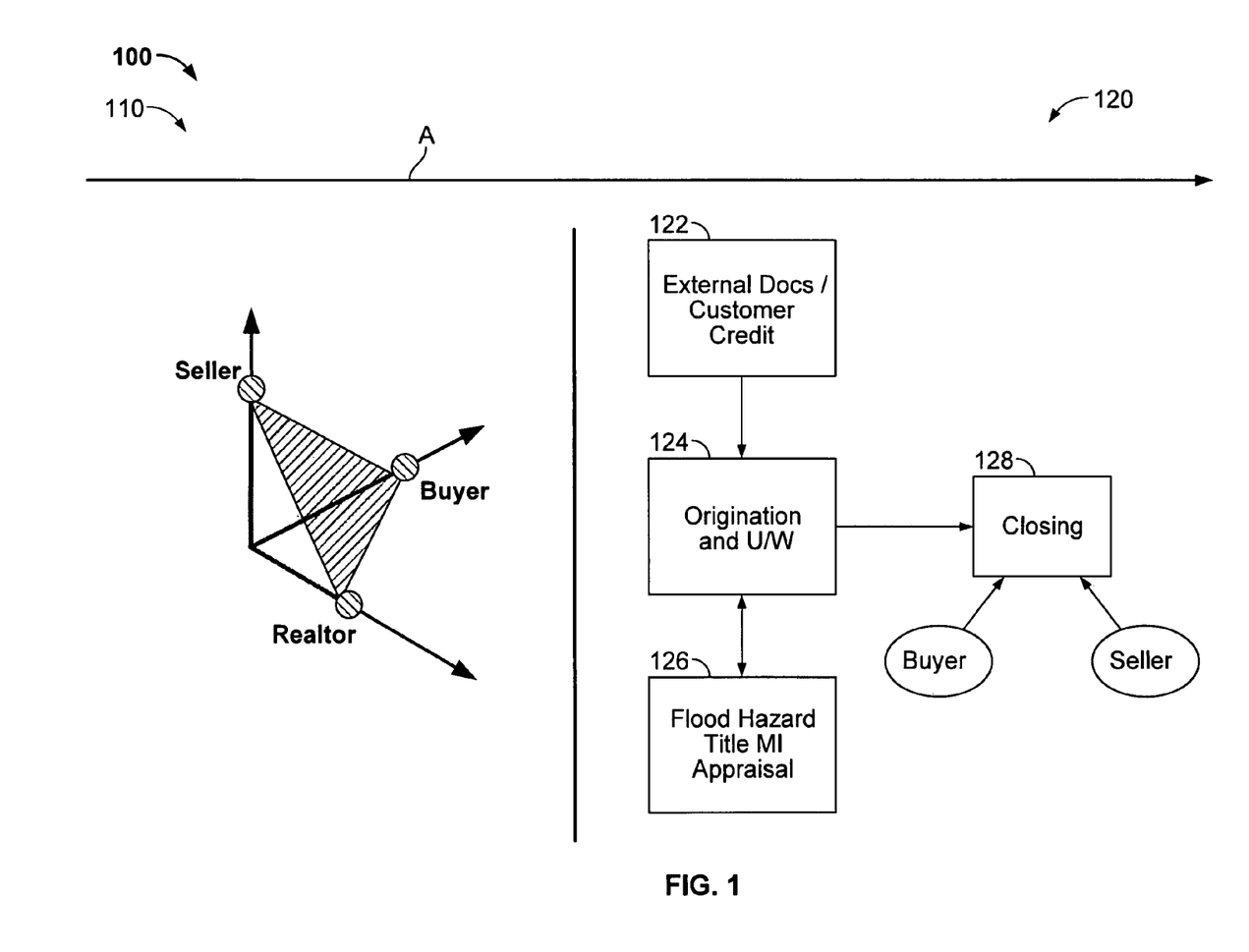
FIG. 1 shows a known process for financing a property transaction.

FIG. 1 shows typical process 100 for financing a property, for example, a home. The process proceeds from sub-process 110 to sub-process 120 along timeline A. Sub-process 110 involves the identification of a property that is to be the collateral for a loan. Process 110 involves a buyer, a seller and a realtor. Sub-process 120 involves approving a loan based on the property identified in process 110. Sub-process 120 typically includes obtaining external documentation and approving customer credit 122. (The customer is typically the buyer.) Then, the bank undertakes origination and underwriting 124. In support of origination and underwriting 124, the bank may obtain, at step 126, flood, hazard and mortgage insurance and an appraisal. These services may be provided by the bank or a vendor. Sub-process 120 is completed at closing step 126, which involves buyer and seller.

Figure 2:
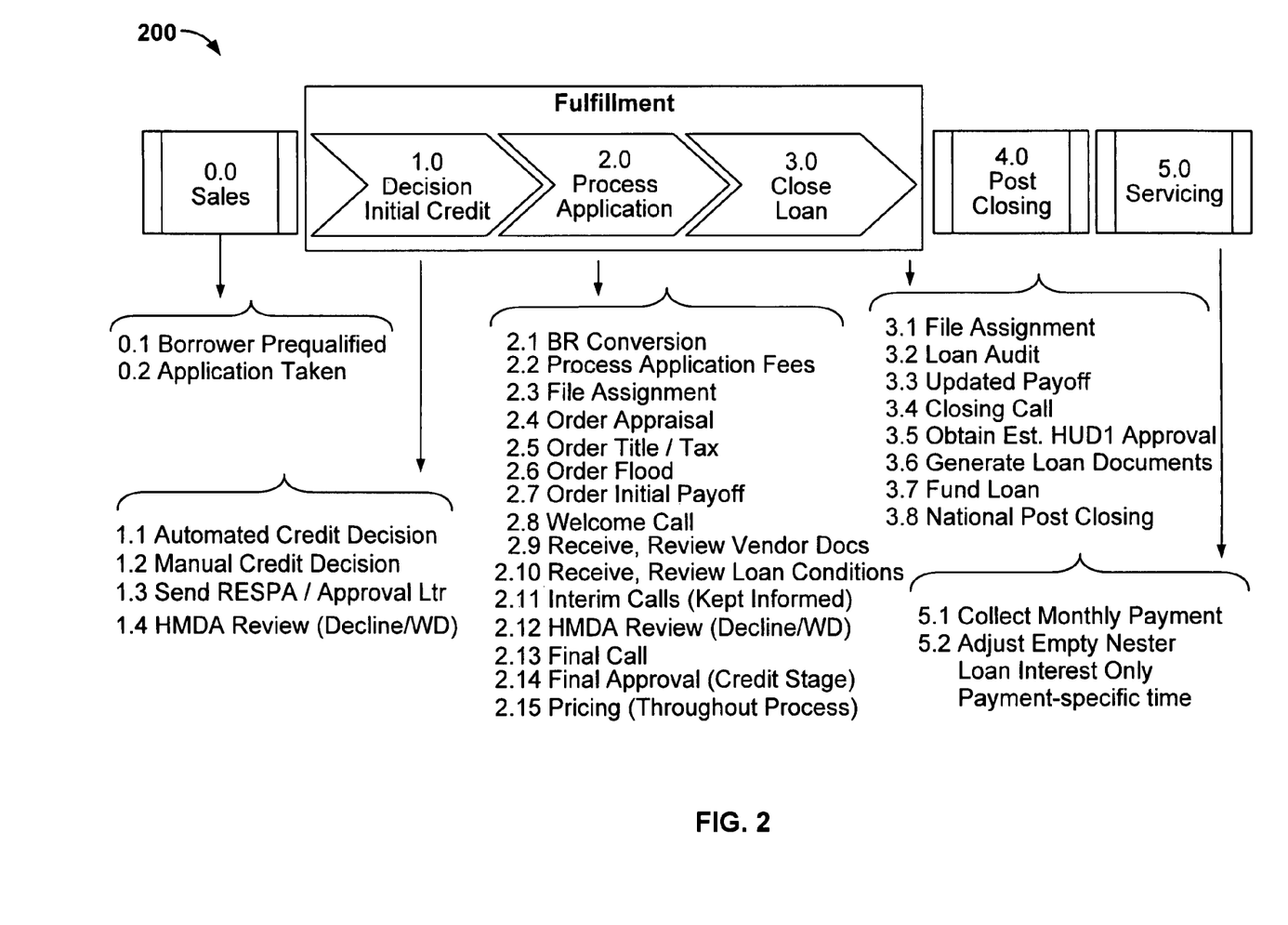
FIG. 2 shows another known process for financing a property transaction.

FIG. 2 shows typical financing process 200, which is performed by a financial institution in connection with the granting of a loan. Process 200 includes high-level steps 0.0 for sales, 1.0 for initial credit decision, 2.0 for application process, 3.0 for closing the loan, 4.0 for post closing actions and 5.0 for servicing. Sales step 0.0 often includes prequalifying a borrower 0.1 and taking an application from the borrower 0.2.

Initial credit decision step 1.0 often includes automated credit decision 1.1, manual credit decision 1.2, transmission of RESPA ("Real Estate Settlement Procedures Act")/approval letter 1.3 and HMDA ("Home Mortgage Disclosure Act" Review 1.4.

Process application step 2.0 often includes BR conversion 2.1, process application fees 2.2, file assignment 2.3, order appraisal 2.4, order title/tax 2.5, order flood insurance 2.6, order initial payoff 2.7, welcome call 2.8, receive, review vendor documents 2.9, receive, review loan conditions 2.10, interim calls 2.11, HMDA review 2.12, final call 2.13, final approval 2.14 and pricing 2.15.

Close loan step 3.0 often includes file assignment 3.1, loan audit 3.2, updated payoff 3.3, closing call 3.4, obtain estimated HUD-1 ("U.S. Department of Housing and Urban Development Form HUD-1") approval 3.5, generate loan documents 3.6, fund loan 3.7 and national post closing requirements 3.8.

Servicing step 5.0 often includes collection of monthly payment 5.1 and adjustment of empty nester loan interest only payment 5.2.

Process application step 2.0 may be lengthy and may delay the time between sales 0.0 and close loan 3.0.

It would be desirable, therefore, to provide apparatus and methods for providing financing for the sale of a property by a seller that reduce loan closing delays.

SUMMARY OF THE INVENTION

It is an object of this invention to provide apparatus and methods for pre-approving collateral for a property purchase loan. Apparatus and methods for providing financing for the sale of a property by a seller are, therefore, provided. The apparatus and methods may involve receiving from the seller an application for approval of a loan for the purchase of the property. The apparatus and methods may involve certifying before the property is listed for sale that the loan will be granted to a qualified buyer. The apparatus and methods may include appraising the property; and assigning an amount to the loan, the amount being based on a value determined by the appraisal. The apparatus and methods may include certifying that a loan, if granted, will be in a stated amount.

In some embodiments, the apparatus and methods may include a loan preapproval platform. The loan pre-approval platform may include an input module. The input module may include a receiver that is configured to receive collateral information from the seller or a representative of the seller. The collateral information may include information that identifies the property, such as location, tax, title and lien information. The platform may include a processor that is configured to launch at least one collateral approval process. The platform may automatically launch the process in response to receipt of the collateral information. The collateral approval process may be any suitable process for approving a loan corresponding to the collateral, including a property appraisal process.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for providing financing for the sale of property by a seller are provided. The methods may include receiving from the seller an application for approval of a loan for the purchase of the property. The methods may include certifying—before the property is listed for sale—that the loan will be granted to a qualified buyer. The apparatus may include a loan preapproval platform. The preapproval platform may include an input module. The input module may include a receiver configured to receive collateral information from a representative of the property seller. The apparatus may include a processor. The processor may be configured to launch one or more collateral approval processes. The processes may include performance of an appraisal of the property.

The apparatus and methods of the present invention may provide a real estate transaction process that is more streamlined than those that are currently available. The real estate may be either residential or commercial real estate. For the purpose of illustration, the apparatus and methods will be described in the context of a residential real estate transaction.

In accordance with the principles of the invention, when a seller puts a house on the market for sale, a financial institution may provide the seller with transaction-related documents before a buyer presents an offer to the seller. The documents may be provided to the seller before the property is listed for sale. The financial institution may be a bank. The bank may guarantee the documentation. The bank may perform any suitable tasks associated with the evaluation of the house. The tasks may include an appraisal, analysis of comparable property values, analysis of debt risk, or any other suitable tasks that are associated with collateralization of a mortgage. The documentation may include a commitment to lend an amount to finance the transaction. The commitment may be contingent upon approval of the buyer as a borrower.

The bank may provide a certificate or a seal that certifies the documentation as well as the loan amount. The seal may be used as an indication to the buyer that the collateral is approved, inspected and meets bank standards for the loan to close. The collateral may thus be referred to as "pre-approved collateral." Pre-approving collateral may avoid the need for a property to undergo validation after the seller lists the property and before closing. The validation may include inspection, appraisal, comparisons and any other related acts. Such a seal may integrate buyers, sellers and realtors. The seal may increase the speed and efficiency of the transaction. The property may be ready for immediate sale at POS ("point of sale"). The property may be ready for immediate sale at POS at the time the property is listed. The property may be listed via MLS ("multi-listing service").

The bank may collect a fee to issue the seal for the property. Some or all of the fee may be contingent upon sale of the home within a predetermined time period. The seller may benefit from obtaining the seal, because this would ensure that the property is closed quickly once he finds a buyer. In some instances, the bank may offer the seller a discount. For example, if the seller is an existing customer of the bank, the bank may offer the seal at a reduced price.

The seal may benefit the buyer, because the collateral is already verified by the bank and a loan is already pre-approved subject to normal "credit history verification." In some embodiments, the bank may offer the buyer a discount in rate for a property transaction involving a seal. The realtor may benefit, because the deal may close quickly. In some embodiments, realtors representing sellers holding seals may offer a discount to the seller because the seal has an implicit guarantee.

The bank may provide a basis point (or points) discount on a loan with a seal. The bank itself may realize a savings, with or without the discount, because all the due diligence was done by bank-approved vendors under the direction of the bank.

A bank may offer the seal and associated services at a discount to members of a real estate joint venture or builder alliance. The bank may offer the seal at discount or for a rebate to an existing mortgage customer if the existing mortgage customer obtains his next loan with the bank. The bank may offer the seal and associated services at a discount to entities that provide corporate relocation or relocation buyout services.

In some embodiments, collateral approval may be finished before a property is listed. Collateral approval may involve appraising the property, binding or securing flood or hazard insurance, performing inspections, search for title issues and any other suitable tasks.

In some embodiments, the seal may be used to signify that the house appliances include certain warranties, such as 1-, 2- or 3-year warranties or warranties for any suitable length of time.

The seal may be used in connection with a "close-on-time service" guarantee. For example, the seal may be used to indicate that a buyer who applies for the pre-approved loan from the offering bank will be able to close the loan within a stated number of days of making application for the loan. The bank may offer a contingency if the loan does not close within the stated number of days. For example, the bank may offer to pay the first month's mortgage payment if the loan does not close within the stated number of days. The stated number of days may be any suitable number of days, such as any number between 1 and 30 or a number greater than 30.

As an incentive, the bank may offer the buyer reduced or waived fees for services that the buyer may require in the future. The services may include, for example, collateral appraisal, title work and any other suitable services.

Independent of providing the seal, when a buyer puts in an offer to buy the house, the bank will need to evaluate the credit credentials of the borrower. The bank may adjust the loan amount and may negotiate appropriate terms based on the borrower's credentials.

A buyer may elect to obtain financing from a financial institution that is different from the pre-approving financial institution. The terms governing rights in the pre-approval documentation (such as the appraisal, comparison data, title diligence data, insurance data and the like) may be contractually arranged. In some embodiments, the pre-approving financial institution may own the documents. In some embodiments, the pre-approving financial institution may offer the pre-approval documents for sale to the financial institution selected by the buyer. The pre-approving financial institution may offer the pre-approval documents for sale to any suitable financial institution or any other suitable entity.

The collateral approval platform may be used in connection with the bank's web site. The web site may be used to present pre-approved properties. The platform may be a tool for quickly and accurately confirming the salability of property by proactively verifying title, appraisal, inspections etc. prior to the signing of a contract between seller and buyer. In some embodiments, the confirmation may be placed on the platform prior to the property being listed for sale.

The platform may include a secure web site through which participating agents (buyer, seller and realtors) can manage property transaction and property search process. The platform may include an initiator engine and a pre-approval storage engine.

A user, such as a seller or a realtor may initiate a pre-approval process using the initiator engine. Initiation of the process may require the user to identify the property and the owner. When the property comes in through the collateral approval platform initiator engine, the initiator may automatically launch a collateral approval processes. The processes may include a title search, an appraisal and the like.

Once the collateral approval processes are complete, the platform may issue a seal or other certificate indicating the pre-approval and the amount of a loan that the bank will offer to a buyer. The amount may be contingent on the buyer's later credit qualification.

After pre-approval by the initiator engine, the records for the property may be transferred to the preapproval storage engine. The storage engine may be accessible from the bank's web site front end. This may provide public access to some or all of the records. The storage engine's inventory of pre-approved property records may be updated in real time. In some embodiments, when a pre-approved property is sold, the records may continue to be stored in the storage engine. The storage engine thus may be used as an archive of sold properties. The archive may include transaction histories for those properties. Also, the storage engine may be used as a bulletin board for newly pre-approved properties FIGS. 3-7 show illustrative embodiments and features of the invention.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 3:
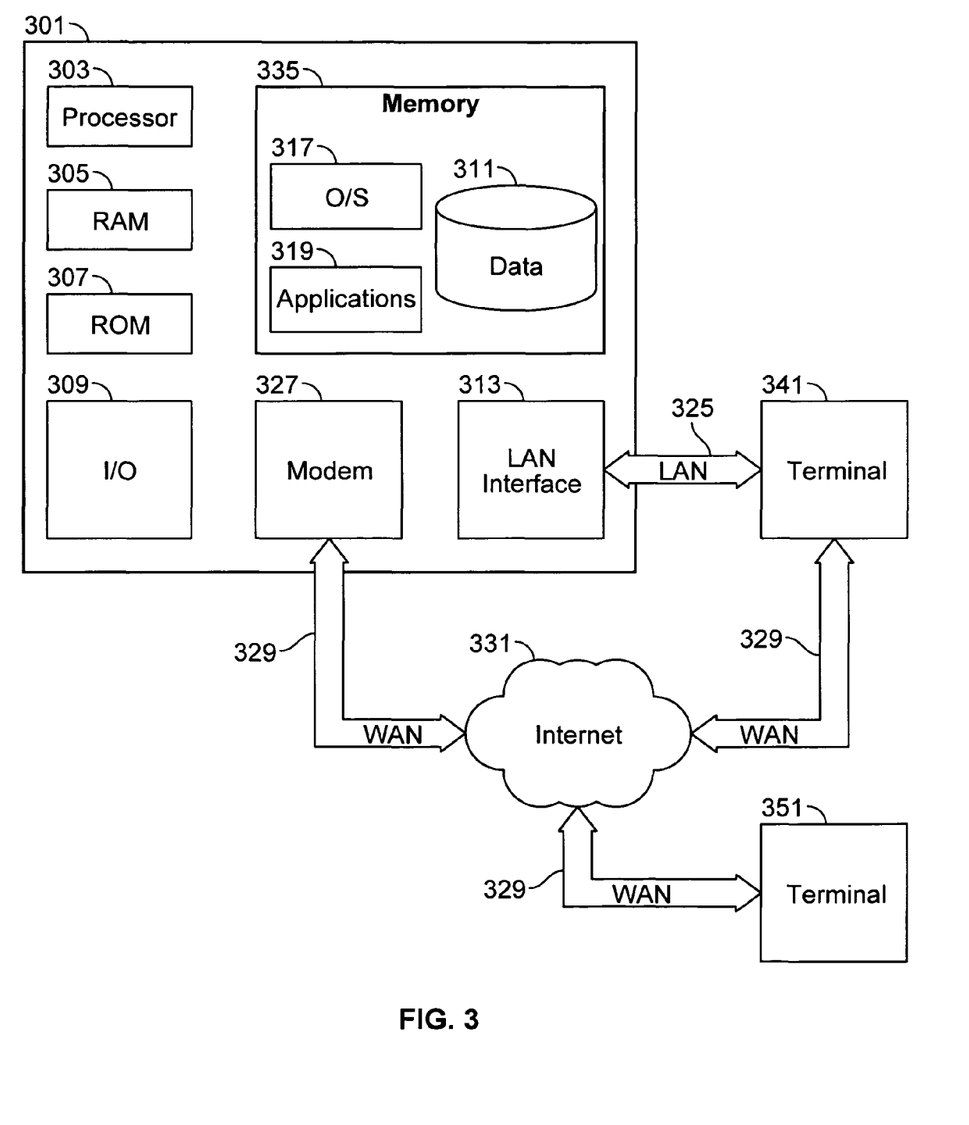
FIG. 3 shows apparatus that may be used in accordance with the principles of the invention.

FIG. 3 is a block diagram that illustrates a generic computing device 301 (alternatively referred to herein as a "server") that may be used according to an illustrative embodiment of the invention. The computer server 301 may have a processor 303 for controlling overall operation of the server and its associated components, including RAM 305, ROM 307, input/output module 309, and memory 325.

Input/output ("I/O") module 309 may include a microphone, keypad, touch screen, and/or stylus through which a user of device 301 may provide input, and may also include one or more of a speaker for providing audio output and a video display device for providing textual, audiovisual and/or graphical output. Software may be stored within memory 325 and/or storage to provide instructions to processor 303 for enabling server 301 to perform various functions. For example, memory 325 may store software used by server 301, such as an operating system 317, application programs 319, and an associated database 321. Alternatively, some or all of server 202 computer executable instructions may be embodied in hardware or firmware (not shown). As described in detail below, database 321 may provide storage for pre-approved property information. The information may include collateral information, loan information, appraisal information, inspection information, closing information, title information, tax information, insurance information, seller information and any other suitable information.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 323. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown).

A prospective seller, a seller's agent, a buyer or a prospective buyer may use a terminal such as 341 or 351 to utilize upload, download or view preapproved property information. Applications 319 may include a web server engine, a database engine, actuarial analysis applications, applications for launching processes described in more detail below and any other suitable applications.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 4:
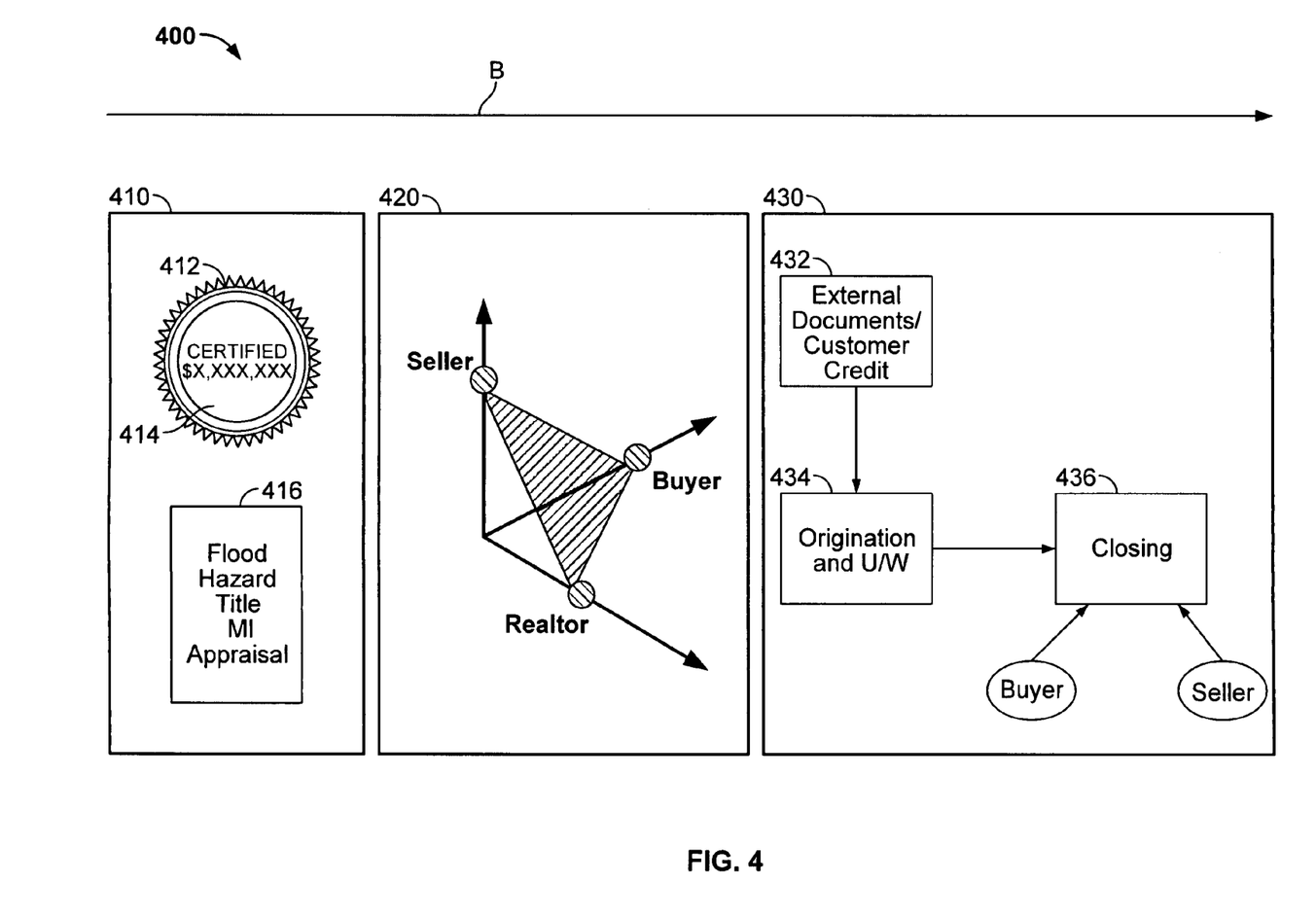
FIG. 4 shows a process in accordance with the principles of the invention.

FIG. 4 shows illustrative process 400 for financing the purchase of a property in accordance with the principles of the invention. Process 400 may take place along timeline B. Process 400 begins at sub-process 410. In sub-process 410, a seller or his representative may engage the bank to acquire seal 412 to demonstrate that a qualified buyer will be entitled to borrow stated amount 414. Sub-process 410 may also include the fulfillment of requirements 416 which may be necessary or appropriate for closing the loan. Requirements 416 may include binding of flood, hazard, title and mortgage insurance. Requirements 416 may include appraisal of the property.

In sub-process 420, the buyer, the seller and the realtor act to identify a property that is to be the subject of a transaction. Sub-process 420 may occur after the seller has finished (or partially finished) sub-process 410. The seller may list the property for sale between sub-process 410 and sub-process 420. After the property is identified in sub-process 420, the purchase may be financed in sub-process 430. Sub-process 430 may include step 432. At step 432, the bank may obtain external documents and evaluate customer credit. At step 434, the bank may undertake loan origination and underwriting. At step 436, the bank, together with the buyer and the seller, may close the loan.

Figure 5:
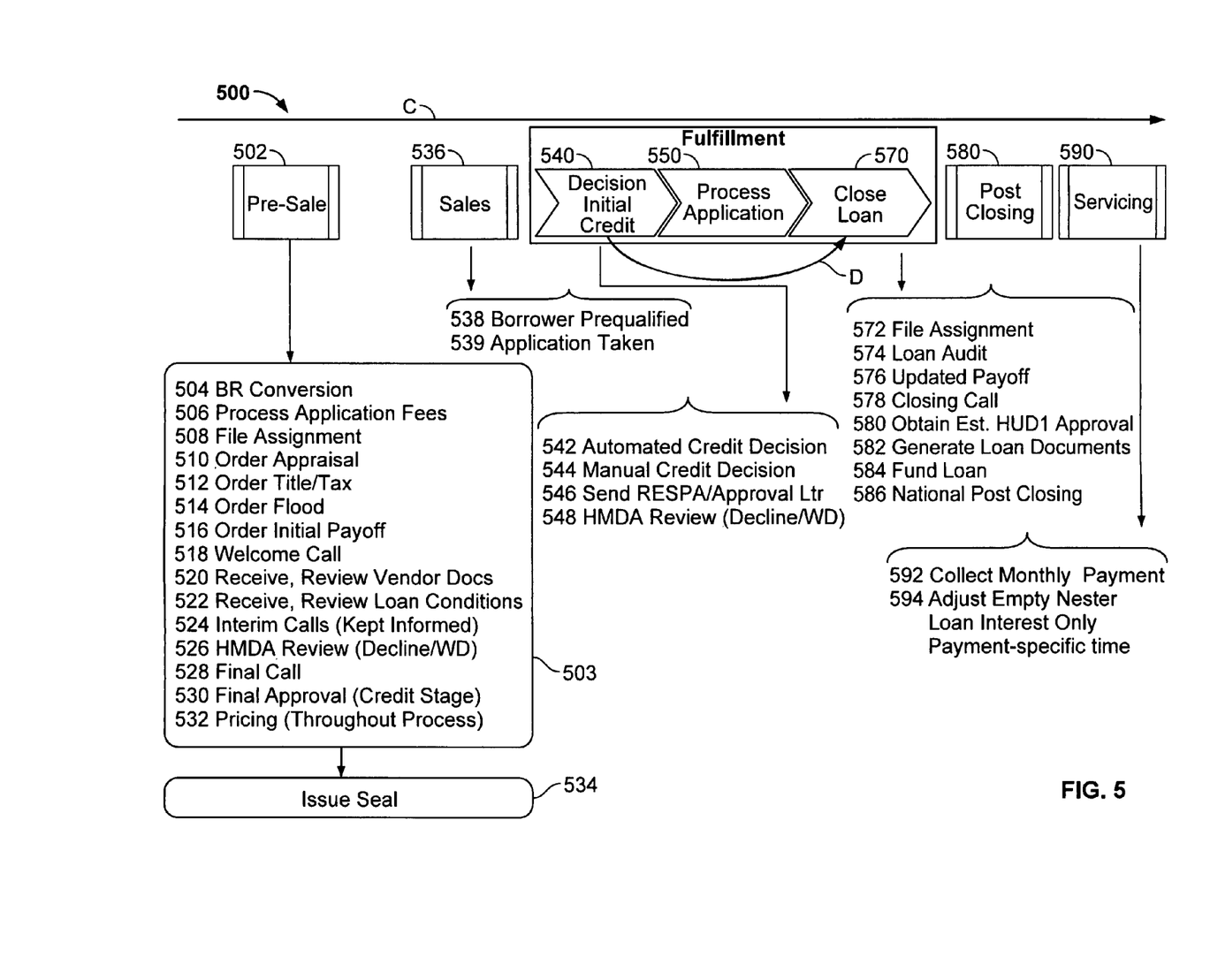
FIG. 5 shows another process in accordance with the principles of the invention.

FIG. 5 shows illustrative financing process 500, which may be performed by a financial institution in connection with the evaluation and/or granting of a loan. Process 500 may proceed along timeline C. Process 500 may include high-level steps 502 for pre-sales activity, 536 for sales, 540 for an making an initial credit decision regarding a buyer, 570 for closing the loan, 580 for post closing actions and 590 for servicing.

Pre-sales step 502 may include one or more of sub-processes 503: BR conversion 504, process application fees 506, file assignment 508, order appraisal 510, order title/tax 512, order flood insurance 514, order initial payoff 516, welcome call 518, receive, review vendor documents 520, receive, review loan conditions 522, interim calls 524, HMDA review 526, final call 528, final approval 530 and pricing 532. After the execution of one or more of sub-processes 503, a seal may be issued at step 534. The seal may have one or more of the features shown and described in connection with seal 412 (shown in FIG. 4).

Sub-processes 503 may be performed prior to sales step 536. Sub-processes 503 may be performed prior to the listing of the property for sale. Sub-processes 503 may be performed prior to the execution of a contract between the seller and a buyer. When sub-processes 503 are performed before sales step, sub-processes 503 do not have to be performed between decision regarding initial credit 540 and close loan 570. Instead, process 500 may proceed along path D, which connects decision regarding initial credit 540 directly to close loan 570.

Sub-process 536 may include prequalifying a buyer 538 and taking an application 539. Sub-process 540 may include automated credit decision 542, manual credit decision 544, transmission of RESPA and/or approval letter 546 and HMDA review 548.

Sub-process 580 may include file assignment 527, loan audit 574, updated payoff 576, closing call 578, obtaining estimated HUD1 approval 580, generation of loan documents 582, fund loan 584 and national post closing 586.

Sub-process 590 may include collect monthly payment 592 and adjust empty nester loan 594.

Figure 6:
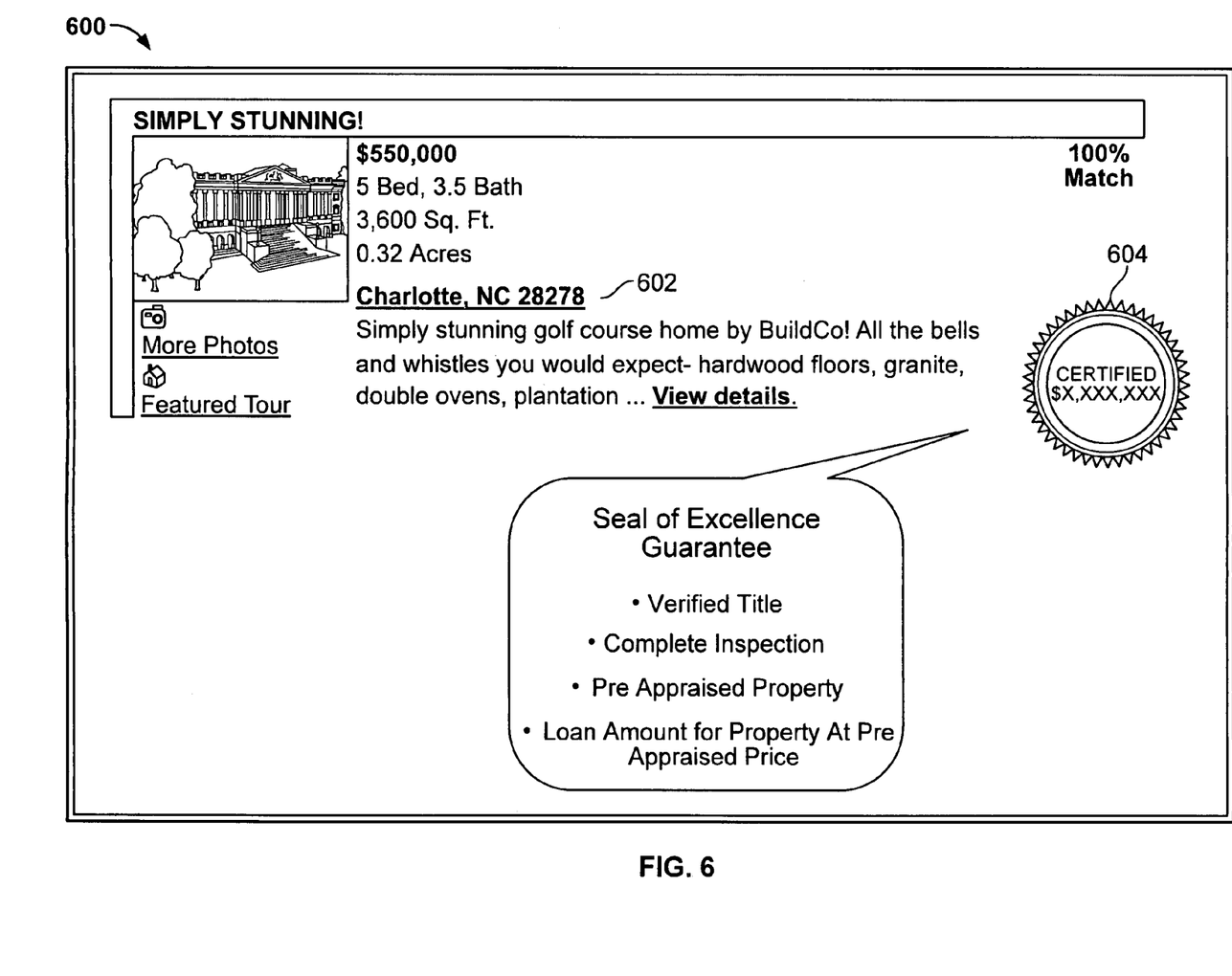
FIG. 6 shows information that may be used in accordance with the principles of the invention.

FIG. 6 shows illustrative screen shot 600. Screen shot 600 may be a web page that may be based on a pre-approved loan. The web page may be stored in a database such as 311 (shown in FIG. 3). The web page may be used by sellers and sellers' agents to present sale property information 602, seal 604 and any other suitable information. Buyers may use the database to search for available properties and, in particular, for properties designated with a seal such as 604. Seal 604 may have one or more of the features associated with seal 412 (shown in FIG. 4).

Figure 7:
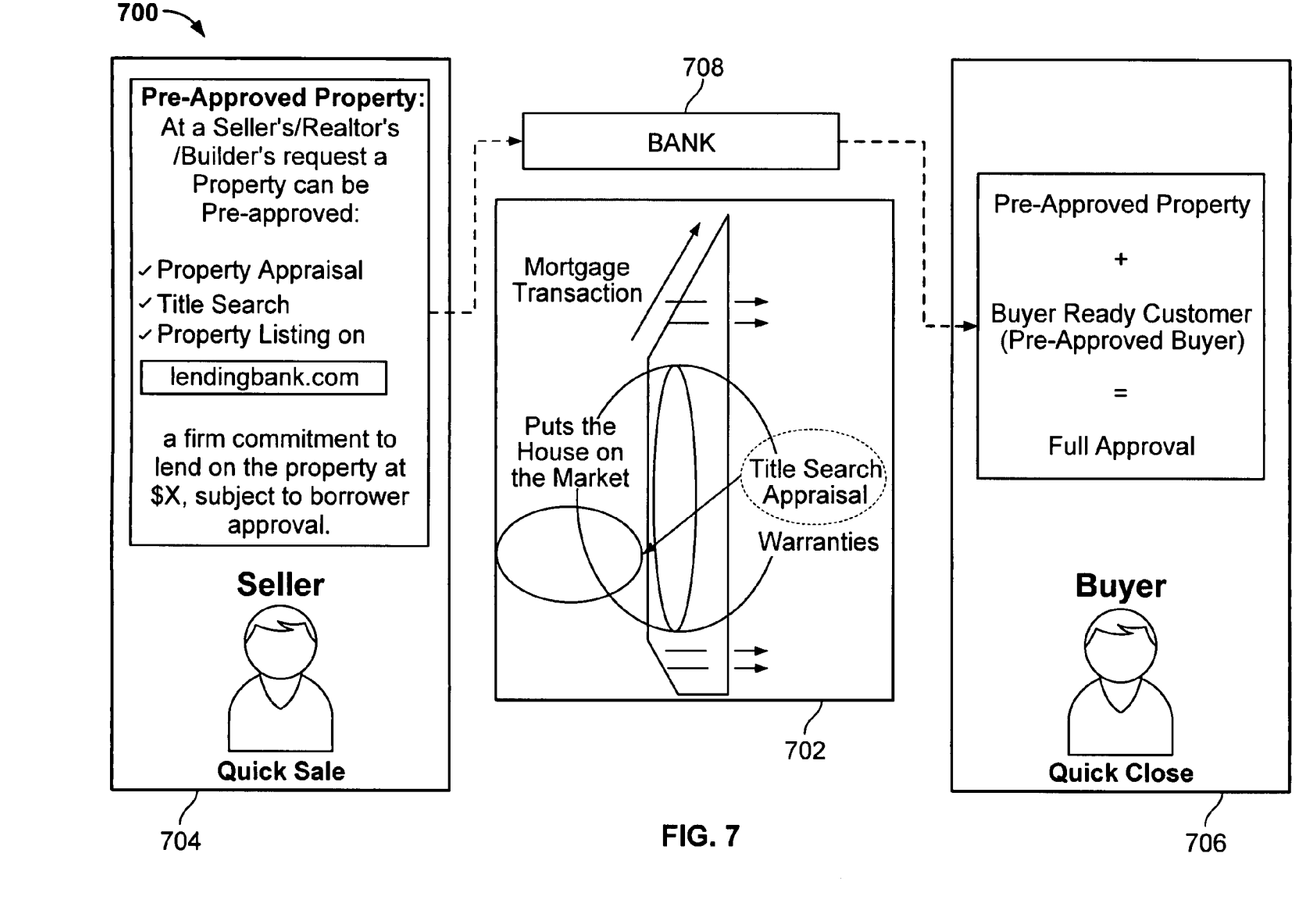
FIG. 7 shows another process in accordance with the principles of the invention.

FIG. 700 shows schematically illustrative transaction requirements 702. Transaction requirements 702 may be associated with a transaction that is to take place between seller 704 and buyer 706. Seller 704 may sell a property that is pre-approved, as shown and described herein. The pre-approval may reduce the time required for a buyer to close on a loan, as described, for example in FIG. 5. Buyer 706 is shown as a buyer that is pre-approved by bank 708. Because both the property and the buyer are pre-approved, bank 798 can bypass—or, at least, need not repeat—one or more of transaction requirements 702.

Aspects of the invention have been described in terms of illustrative embodiments thereof. A person having ordinary skill in the art will appreciate that numerous additional embodiments, modifications, and variations may exist that remain within the scope and spirit of the invention.

One of ordinary skill in the art will appreciate that the apparatus features described herein and illustrated in the FIGS. may be arranged in other than the recited configuration and that one or more of the features may be optional. Also, the methods described herein and illustrated in the FIGS. may be performed in other than the recited order and that one or more steps illustrated may be optional. The above-referenced embodiments may involve the use of other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing financing for the sale of a property have been provided. Persons skilled in the art will appreciate that the present invention can be practiced by other than the described embodiments, which are presented for purposes of illustration rather than of limitation, and that the present invention is limited only by the claims that follow.

What is claimed is:

1. One or more computer-readable media storing computer-executable instructions which, when executed by a processor on a computer system, perform a method for providing financing for the sale of a property, the financing being provided by a financial institution, the method using an electronic information processing platform, the method comprising:

in response to receiving an application from a seller for pre-approval of a loan amount relating to the purchase of the property, using an initiator engine to launch a collateral approval process;

before the property is listed for sale, and in response to completion of the collateral approval process; using an initiator engine to issue a certification certifying that a pre-approved loan amount will be granted by the financial institution to a qualified buyer; and using a pre-approval storage engine to electronically store the certification.

2. The method of claim 1 further comprising appraising the property wherein the pre-approved loan amount is based on a value determined by the appraising.

3. The method of claim 2 further comprising determining whether pre-approval of the loan amount requires disclosure under the Home Mortgage Disclosure Act.

4. The method of claim 2 further comprising collecting a loan application fee from the seller.

5. The method of claim 2 further comprising determining whether pre-approval requires mortgage insurance.

6. The method of claim 2 further comprising determining an initial payoff amount.

7. The method of claim 2 further comprising formulating a loan condition.

8. The method of claim 2 further comprising formulating a sale price amount.

9. The method of claim 2 further comprising designating a qualified buyer credential.

10. The method of claim 1 wherein the certification is electronically stored on an electronic bulletin board for pre-approved properties.

11. An electronic loan pre-approval platform comprising:
an input module including a receiver configured to receive collateral information from a representative of a seller of a property;
a first processor configured to launch at least one collateral approval process, the at least one collateral approval process including receiving an appraisal of the property;
a second processor configured to electronically grant collateral approval before the property is listed for sale, the electronic grant for collateral approval representing a grant of collateral approval from a financial institution; and
a third processor configured to issue a certification certifying that a pre-approved loan amount, based at least in part on the grant for collateral approval, will be granted by the financial institution to a qualified buyer.

12. The platform of claim 11 wherein the collateral information includes an address.

13. The platform of claim 11 wherein the collateral information includes a property tax identifier.

14. The platform of claim 11 wherein the representative is the seller.

15. The platform of claim 11 wherein the representative is a realtor.

16. The platform of claim 11 wherein the at least one process includes a title search.

17. The platform of claim 11 wherein the at least one process includes listing the property for sale.

18. The platform of claim 11 wherein the at least one process includes collection of an application fee.

19. The platform of claim 11 wherein the at least one process includes placing an order for flood insurance.

20. The platform of claim 11 wherein the at least one process includes determining whether pre-approval requires mortgage insurance.

21. The platform of claim 11 wherein the at least one process includes determining whether pre-approval requires disclosure under the Home Mortgage Disclosure Act.

22. The platform of claim 11 wherein the at least one process includes an order for an initial payoff amount.

23. The platform of claim 11 wherein the at least one process includes formulation of loan conditions.

24. The platform of claim 11 wherein the at least one process includes formulating a sale price amount.

25. The platform of claim 11 wherein the at least one process includes approving a loan amount.

26. The platform of claim 11 wherein the at least one process includes approving a loan amount that is contingent on credentials to be presented by a buyer.

27. The method of claim 11 wherein the first processor and the second processor are the same processor.

28. The method of claim 11 wherein the first processor is different from the second processor.

* * * * *